F. L. SESSIONS.
LOCOMOTIVE CURRENT SUPPLYING MECHANISM.
APPLICATION FILED FEB. 18, 1908.
1,035,249.
Patented Aug. 13, 1912.
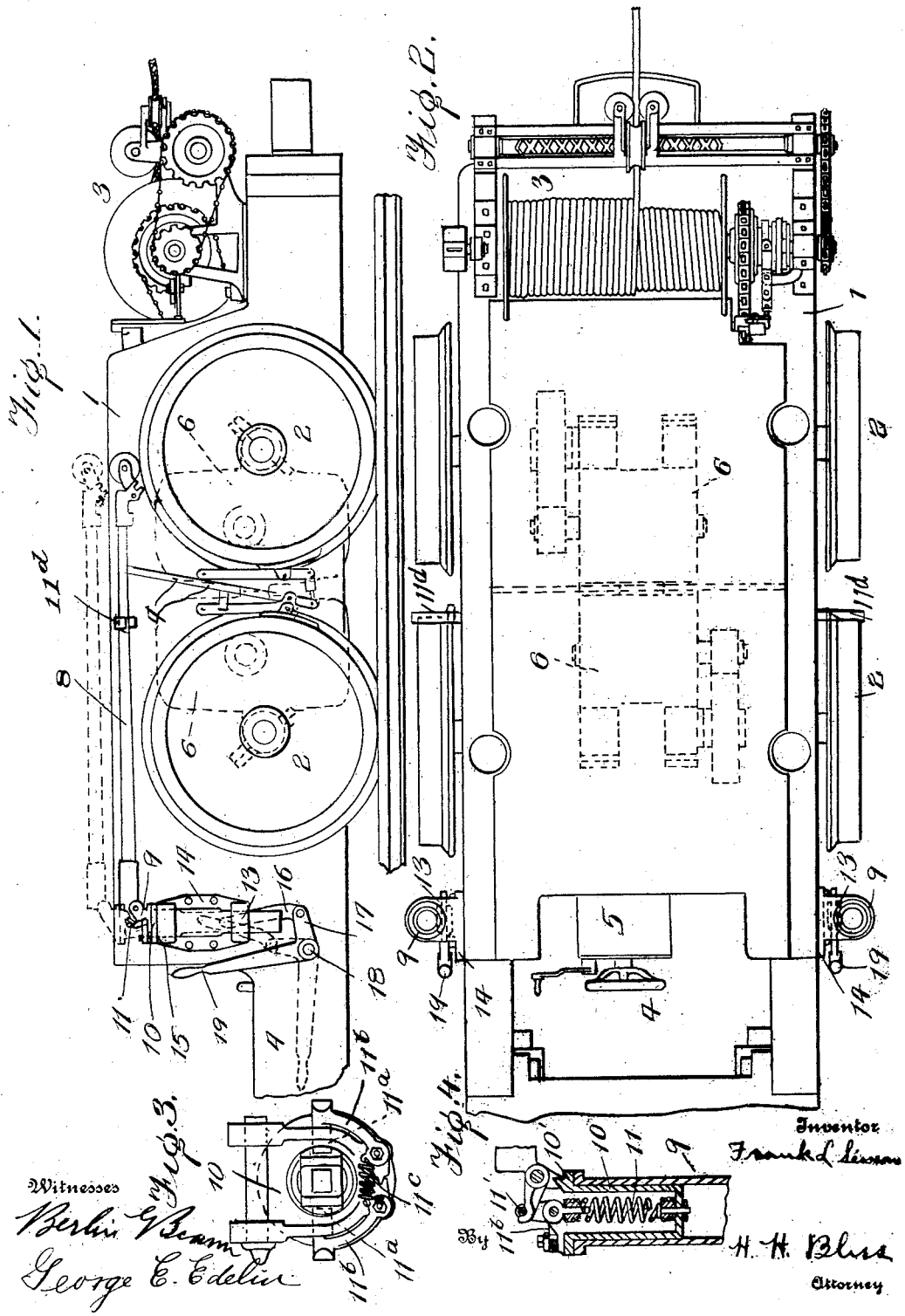

UNITED STATES PATENT OFFICE.

FRANK L. SESSIONS, OF COLUMBUS, OHIO, ASSIGNOR TO JEFFREY MANUFACTURING COMPANY, A CORPORATION OF OHIO.

LOCOMOTIVE CURRENT-SUPPLYING MECHANISM.

1,035,249.     Specification of Letters Patent.     Patented Aug. 13, 1912.

Application filed February 18, 1908. Serial No. 416,545.

*To all whom it may concern:*

Be it known that I, FRANK L. SESSIONS, a citizen of the United States, residing at Columbus, in the county of Franklin and State of Ohio, have invented certain new and useful Improvements in Locomotive Current-Supplying Mechanism, of which the following is a specification, reference being had therein to the accompanying drawing.

My invention relates to electric motor cars and particularly to electric mine locomotives, and has for its object to provide an improved form of current supplying mechanism.

My improved current supplying mechanism has a trolley device capable of receiving current from an overhead trolley wire and a cable adapted to be wound upon a reel and capable of receiving current from a remote fixed conductor. When the cable and reel are in operation, the trolley device may be depressed completely below the top plane of the locomotive, the locomotive being thus adapted for operation in mine entries and rooms having low roofs.

In the drawings, Figure 1 is a side view of a mine locomotive embodying my invention. Fig. 2 is a plan view of the same. Fig. 3 is a detail plan view of the tubular casting 10 and the adjacent parts. Fig. 4 is a vertical sectional view of the same.

In the drawings, 1 indicates the locomotive frame supported upon the track rails by means of the wheels 2—2.

3 indicates a cable reeling device by means of which the locomotive is supplied with current, when it is run into rooms and other parts of the mine, unequipped with a trolley wire.

In general the locomotive shown in the drawings is constructed in the usual manner being provided with the rear motorman's platform 4, controller 5, motors 6, braking apparatus 7 etc.

Upon each side of the locomotive and near the end adjacent to the motorman's platform is mounted one of the trolley pole bases 9—9. A trolley pole 8 may be secured to either of the trolley bases 9—9 in any suitable manner. In the well known form of connection shown, the socket piece which carries the pole 8 is pivoted on a horizontal axis to brackets carried by the tubular casting 10, which is rotatably mounted in the trolley base 9. The spring 11 connected at one end to the trolley pole by means of the stirrup 11' and at the other to the bottom of the tubular casting 10, acts to hold the trolley wheel which is carried by the outer end of the pole, in under-running contact with the trolley wire.

The automatic locking device described in Patent No. 684,950 to Robinson serves to hold the trolley pole in a fixed horizontal position when the locomotive is drawing current from the conductor cable or from a storage battery. It consists of the two pins $11^a$ adapted to enter sockets in the lower cross bar of the stirrup and carried by the swinging arms $11^b$ pivoted to the top flange 10' of the casting 10 and drawn toward each other by the spring $11^c$. In lieu of this device or supplemental thereto, a holder $11^d$ may be secured to the locomotive frame in a location to engage the outer end of the trolley pole and secure it in horizontal position when desired.

Each trolley base 9 is an elongated cylindrical casting, vertically movable in the guides 13 which are carried by and preferably integral with the bracket 14 bolted to the side of the locomotive. The lower limit of movement of the trolley base is determined by the shoulder 15 at its upper end. The base is adjusted to its upper or lower position by means of the link 16 pivoted at one end to the trolley base and at the other to the arm 17. This arm is pivoted to the locomotive frame at 18, and is rigid with the hand lever 19. By throwing the latter through an arc of approximately ninety degrees, the arm 17 is rotated through a corresponding arc, and the trolley base is moved from one extreme position of adjustment to the other.

It will be observed that the fixed pivot at one end of the arm 17 is so located with respect to the axis of the trolley base, and the lengths of the arm and link 16 are so proportioned that when the hand lever 19 is thrown to its horizontal position the moving pivot passes beyond the line joining the fixed pivot 18 with the point at which the link 16 is pivoted to the base and engages the inner face of the guide 13, thereby automatically locking the base in its upper position of adjustment.

A vertically adjustable trolley base is desirable under many conditions of operation.

and I do not limit myself to any particular application. But as illustrative of the uses to which it may be put, I will briefly describe a set of conditions under which this form of trolley base is desirable if not absolutely necessary.

The rooms in which gathering locomotives of the cable reel or any other type have to operate are often so low that to economize space vertically, the disposition of the temporarily idle trolley pole below the top parts of the locomotive frame becomes very desirable. When therefore the poles are mounted permanently at such a height that their outer ends can be drawn down to a position such that the whole length of the pole will be below the top of the locomotive, it becomes impossible to reverse the trolley pole in entries of the ordinary height. It is generally impossible to reverse the pole by swinging it away from the locomotive because of the adjacent mine wall; and it is impossible to swing it over the locomotive because of interference with the locomotive frame. It is therefore evident that by making the trolley base vertically adjustable, one position of adjustment rendering it possible to place all parts of the pole below the top of the locomotive, and the other position of adjustment rendering it possible to freely swing the trolley pole through an angle of one-hundred and eighty degrees over the locomotive, the difficulties existing under the conditions set forth are successfully met.

What I claim is:

1. The combination in a locomotive, of a trolley base swiveled thereon at one side thereof, a trolley pole pivoted to the base on a horizontal transverse axis and adapted to make under-running contact with a trolley wire above the locomotive, means for vertically adjusting the base to either of two positions, one such that the pivoted end of the trolley pole is below the top lines of the locomotive, and the other such that the said end of the pole is above the top lines of the locomotive so that the pole can be swung in horizontal planes over the top of the locomotive without interference, means for fastening the contact end of the pole in position below the top lines of the locomotive out of contact with the trolley wire, and means additional to the trolley pole for supplying current to the locomotive.

2. The combination in a locomotive, of a trolley pole mounted thereon so as to be free to swing about both horizontal and vertical axes at its lower end, means for adjusting its lower end vertically to either of two positions, one such that the pivoted end of the trolley pole is below the top lines of the locomotive, and the other such that the said end of the pole is above the top lines of the locomotive so that the pole can be swung in horizontal planes over the top of the locomotive without interference, and means additional to the trolley pole for supplying current to the locomotive.

3. The combination in a locomotive, of a trolley base swiveled thereon at one side thereof, a trolley pole pivoted to the base on a horizontal transverse axis and adapted to make under-running contact with a trolley wire above the locomotive, and means for vertically adjusting the base to either of two positions, one such that the pivoted end of the trolley pole is below the top lines of the locomotive, and the other such that the end of the pole is above the top lines of the locomotive so that the pole can be swung in horizontal planes over the top of the locomotive without interference.

4. The combination in a locomotive, of a trolley base swiveled thereon at one side thereof, a trolley pole pivoted to the base on a horizontal transverse axis and adapted to make under-running contact with a trolley wire above the locomotive, means for vertically adjusting the base to either of two positions, one such that the pivoted end of the trolley pole is below the top lines of the locomotive, and the other such that the end of the pole is above the top lines of the locomotive so that the pole can can be swung in horizontal planes over the of the locomotive without interference, and means for fastening the contact end of the pole in position below the top lines of the locomotive out of contact with the trolley wire.

5. The combination in a locomotive, of a trolley pole mounted thereon so as to be free to swing about both horizontal and vertical axes at its lower end, and means for vertically adjusting its lower end to either of two positions, one such that the pivoted end of the trolley pole is below the top lines of the locomotive, and the other such that the said end of the pole is above the top lines of the locomotive so that the pole can be swung in horizontal planes over the top of the locomotive without interference.

6. The combination in a locomotive, of a trolley pole mounted thereon so as to be free to swing about both horizontal and vertical axes at its lower end, means for vertically adjusting its lower end to either of two positions, one such that the pivoted end of the trolley pole is below the top lines of the locomotive, and the other such that the said end of the pole is above the top lines of the locomotive so that the pole can be swung in horizontal planes over the top of the locomotive without interference, and means for fastening the contact end of the pole in position below the top lines of the locomotive out of contact with the trolley wire.

7. The combination in a locomotive adapted to operate in restricted passageways, the walls whereof closely approach both sides and the top of the locomotive, of a trolley pole mounted thereon and at one side thereof and of a length approximately equal to the width of the locomotive and in a manner such that it is free to swing both about horizontal and vertical axes at its lower end, and means for vertically adjusting its lower end to either of two positions, one such that the pivoted end of the trolley pole is below the top lines of the locomotive, and the other such that the said end of the pole is above the top lines of the locomotive so that the pole can be swung through an angle of 180 degrees in a horizontal plane over the top of the locomotive without interference.

In testimony whereof I affix my signature, in presence of two witnesses.

FRANK L. SESSIONS.

Witnesses:
C. E. WAXBOM,
H. C. FLETCHER.